UNITED STATES PATENT OFFICE.

FRIEDRICH HEUBER, OF CHARLOTTENBURG, GERMANY.

PROCESS OF MANUFACTURING ARTIFICIAL STONES FOR LITHOGRAPHIC OR OTHER PURPOSES.

SPECIFICATION forming part of Letters Patent No. 720,142, dated February 10, 1903.

Application filed July 18, 1901. Serial No. 68,792. (No specimens.)

*To all whom it may concern:*

Be it known that I, FRIEDRICH HEUBER, a subject of the German Emperor, residing in Charlottenburg, in the Kingdom of Prussia, Germany, have invented certain new and useful Improvements in Processes of Manufacturing Artificial Stones for Lithographic or other Purposes, of which the following is a specification.

My invention relates to a process of manufacturing artificial stones, more especially those employed for lithographic purposes, consisting of a mixture of pulverized limestone and a suitable hydraulic cement, composed, for example, of burnt magnesite and a solution of chlorid of magnesium.

The process consists in first producing a dry mixture of about three parts, by volume, of finely-pulverized limestone and one part, by volume, of likewise finely-pulverized burnt magnesite and in then stirring the mixture up with about 1.5 parts, by volume, of a solution of chlorid of magnesium of about 1.27 specific gravity to form a thin paste. This paste is then cast in molds and by the application of a pressure of about five hundred kilograms per square centimeter the solution of chlorid of magnesium again so far expelled that a hard mass is obtained capable of being directly removed from the mold without its cracking or otherwise altering in form. In expressing the superfluous solution of chlorid of magnesium, first, any particles of air which may have remained in the mass are carried out by the strong flow of liquid which is caused through all the pores of the mass. Secondly, the stone is prevented from sweating and warping on lying long in stock.

In the manufacture of artificial stones as proposed it will not answer the purpose to proceed by adding to the dry mixture at the commencement only such quantity of the solution of chlorid of magnesium that under the high pressure to which the mass is subjected none of the solution will be again expressed. This is obvious, for in such case it is impossible for every particle of the powder composing the mixture to be saturated with the chlorid-of-magnesium solution, so that a homogeneous mass cannot be attained. Furthermore, too many particles of air would remain inclosed, since these, as is well known, cannot be completely got rid of by high pressure alone.

Having thus described my invention, what I claim as new, and desire to secure by Letters Patent, is—

The process of manufacturing artificial stone for lithographic and other purposes, consisting in mixing pulverized limestone and burnt magnesite with a sufficient quantity of a solution of chlorid of magnesium to form a thin paste, casting the same, and expressing the superfluous solution of chlorid of magnesium not required for effecting adhesion, substantially as described.

In testimony whereof I have hereunto signed my name in the presence of two subscribing witnesses.

FRIEDRICH HEUBER.

Witnesses:
FRIEDRICH LUDWIG CATENSUNEE,
HENRY HASPER.